(12) United States Patent
Beals, Jr.

(10) Patent No.: US 6,565,147 B1
(45) Date of Patent: May 20, 2003

(54) MAGNETIC REPULSION SYSTEM TO PREVENT COLLISIONS

(76) Inventor: Walter Beals, Jr., 5530 Lavey La., Baker, LA (US) 70714

( * ) Notice: Subject to any disclaimer, the term of this patent is extended or adjusted under 35 U.S.C. 154(b) by 0 days.

(21) Appl. No.: 09/887,231

(22) Filed: Jun. 22, 2001

(51) Int. Cl.$^7$ .................................................. B60J 7/00
(52) U.S. Cl. ........................ 296/187; 293/126; 293/102; 114/219
(58) Field of Search ................................. 293/102, 120, 293/132, 128, 126, DIG. 6; 296/187; 114/219

(56) References Cited

U.S. PATENT DOCUMENTS

| | | | |
|---|---|---|---|
| 3,711,991 A | * | 1/1973 | Orfei et al. |
| 4,068,392 A | | 1/1978 | Montgomery et al. |
| 4,307,668 A | | 12/1981 | Vison |
| 4,913,059 A | | 4/1990 | Fujie et al. |
| 4,993,985 A | | 2/1991 | Bass et al. |
| D331,380 S | | 12/1992 | Craddock |
| 5,441,434 A | | 8/1995 | Caulkins |
| 5,971,451 A | * | 10/1999 | Huang .................. 293/102 |

FOREIGN PATENT DOCUMENTS

| | | | |
|---|---|---|---|
| FR | 2579154 | * | 9/1986 |
| JP | 63-307600 | * | 12/1988 |
| JP | 5-97006 | * | 4/1993 |

* cited by examiner

Primary Examiner—Joseph D. Pape

(57) ABSTRACT

A magnetic repulsion system to prevent collisions of vehicles by use of magnetic forces. The magnetic repulsion system to prevent collisions includes a plurality of mobile vehicles each having a body having an inner surface. Each of a plurality of bars is magnetized and has the same polarity. Each of the bars is coupled to the inner surface of one of the vehicles such that the bars substantially encompass each of the vehicles. The bars on a first of the vehicles are repelled by bars on a second of the vehicles by the magnetic polarity of the bars.

6 Claims, 4 Drawing Sheets

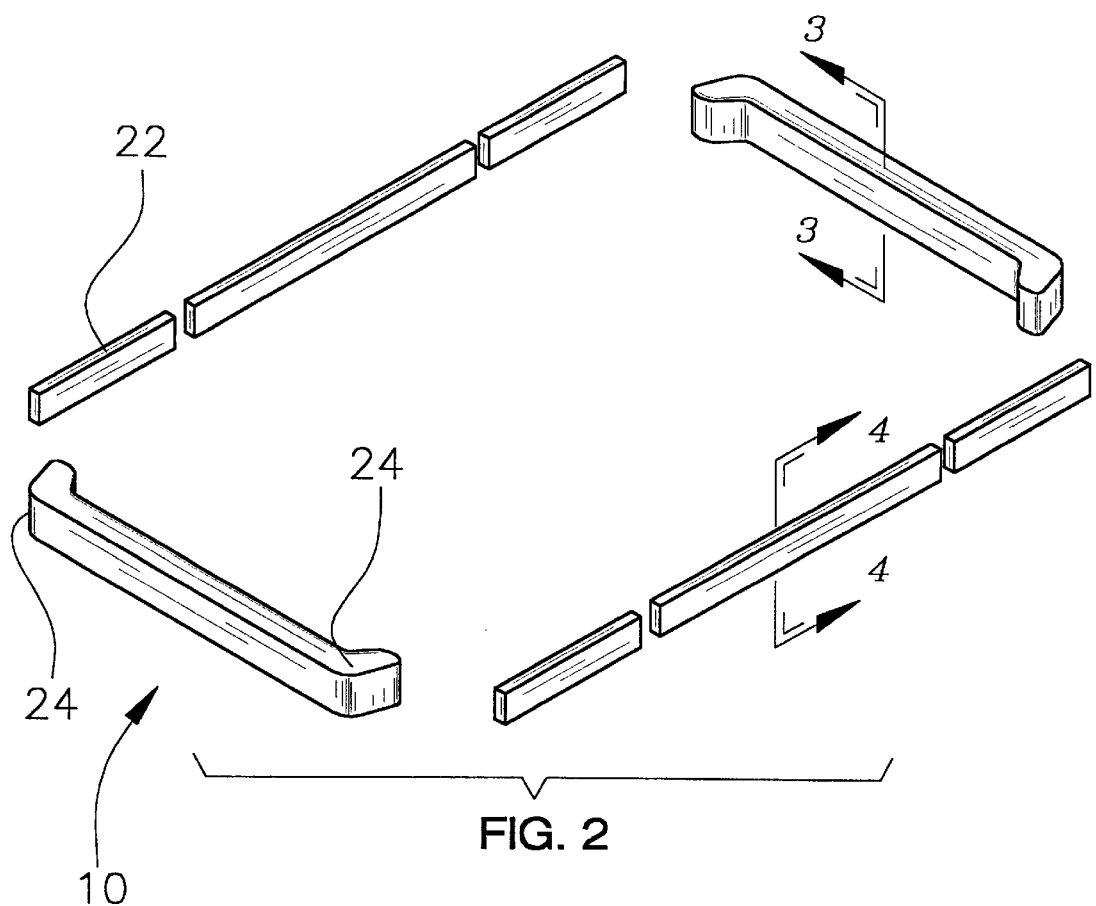
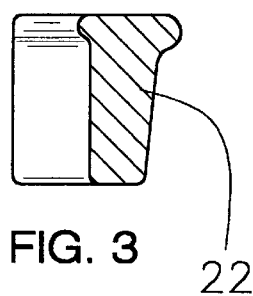
FIG. 2
FIG. 3
FIG. 4

MAGNETIC REPULSION SYSTEM TO PREVENT COLLISIONS

BACKGROUND OF THE INVENTION

1. Field of the Invention

The present invention relates to anti-collision devices and more particularly pertains to a new magnetic repulsion system to prevent collisions for preventing the collision of vehicles by use of magnetic forces.

2. Description of the Prior Art

The use of anti-collision devices is known in the prior art. More specifically, anti-collision devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,993,985; 4,068,396; 4,913,059; 5,441,434; 4,307,668; and U.S. Des. Pat. No. 331,380.

While these devices fulfill their respective, particular objectives and requirements, the aforementioned patents do not disclose a new magnetic repulsion system to prevent collisions. The inventive device includes a plurality of mobile vehicles each having a body having an inner surface. Each of a plurality of bars is magnetized and has the same polarity. Each of the bars is coupled to the inner surface of one of the vehicles such that the bars substantially encompass each of the vehicles. The bars on a first of the vehicles are repelled by bars on a second of the vehicles by the magnetic polarity of the bars.

In these respects, the magnetic repulsion system to prevent collisions according to the present invention substantially departs from the conventional concepts and designs of the prior art, and in so doing provides an apparatus primarily developed for the purpose of preventing the collision of vehicles by use of magnetic forces.

SUMMARY OF THE INVENTION

In view of the foregoing disadvantages inherent in the known types of anti-collision devices now present in the prior art, the present invention provides a new magnetic repulsion system to prevent collisions construction wherein the same can be utilized for preventing the collision of vehicles by use of magnetic forces.

The general purpose of the present invention, which will be described subsequently in greater detail, is to provide a new magnetic repulsion system to prevent collisions apparatus and method which has many of the advantages of the anti-collision devices mentioned heretofore and many novel features that result in a new magnetic repulsion system to prevent collisions which is not anticipated, rendered obvious, suggested, or even implied by any of the prior art anti-collision devices, either alone or in any combination thereof.

To attain this, the present invention generally comprises a plurality of mobile vehicles each having a body having an inner surface. Each of a plurality of bars is magnetized and has the same polarity. Each of the bars is coupled to the inner surface of one of the vehicles such that the bars substantially encompass each of the vehicles. The bars on a first of the vehicles are repelled by bars on a second of the vehicles by the magnetic polarity of the bars.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnetic repulsion system to prevent collisions apparatus and method which has many of the advantages of the anti-collision devices mentioned heretofore and many novel features that result in a new magnetic repulsion system to prevent collisions which is not anticipated, rendered obvious, suggested, or even implied by any of the prior art anti-collision devices, either alone or in any combination thereof.

It is another object of the present invention to provide a new magnetic repulsion system to prevent collisions which may be easily and efficiently manufactured and marketed.

It is a further object of the present invention to provide a new magnetic repulsion system to prevent collisions which is of a durable and reliable construction.

An even further object of the present invention is to provide a new magnetic repulsion system to prevent collisions which is susceptible of a low cost of manufacture with regard to both materials and labor, and which accordingly is then susceptible of low prices of sale to the consuming public, thereby making such magnetic repulsion system to prevent collisions economically available to the buying public.

Still yet another object of the present invention is to provide a new magnetic repulsion system to prevent collisions which provides in the apparatuses and methods of the prior art some of the advantages thereof, while simultaneously overcoming some of the disadvantages normally associated therewith.

Still another object of the present invention is to provide a new magnetic repulsion system to prevent collisions for preventing the collision of vehicles by use of magnetic forces.

Yet another object of the present invention is to provide a new magnetic repulsion system to prevent collisions which includes a plurality of mobile vehicles each having a body having an inner surface. Each of a plurality of bars is magnetized and has the same polarity. Each of the bars is coupled to the inner surface of one of the vehicles such that the bars substantially encompass each of the vehicles. The bars on a first of the vehicles are repelled by bars on a second of the vehicles by the magnetic polarity of the bars.

Still yet another object of the present invention is to provide a new magnetic repulsion system to prevent collisions that prevents collisions and also slows collisions which cannot be prevented.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic cross-sectional view taken along line 3—3 of FIG. 2 of the present invention.

FIG. 4 is a schematic cross-sectional view taken along line 4—4 of FIG. 2 of the present invention.

DESCRIPTION OF THE PREFERRED EMBODIMENT

Figure 1:
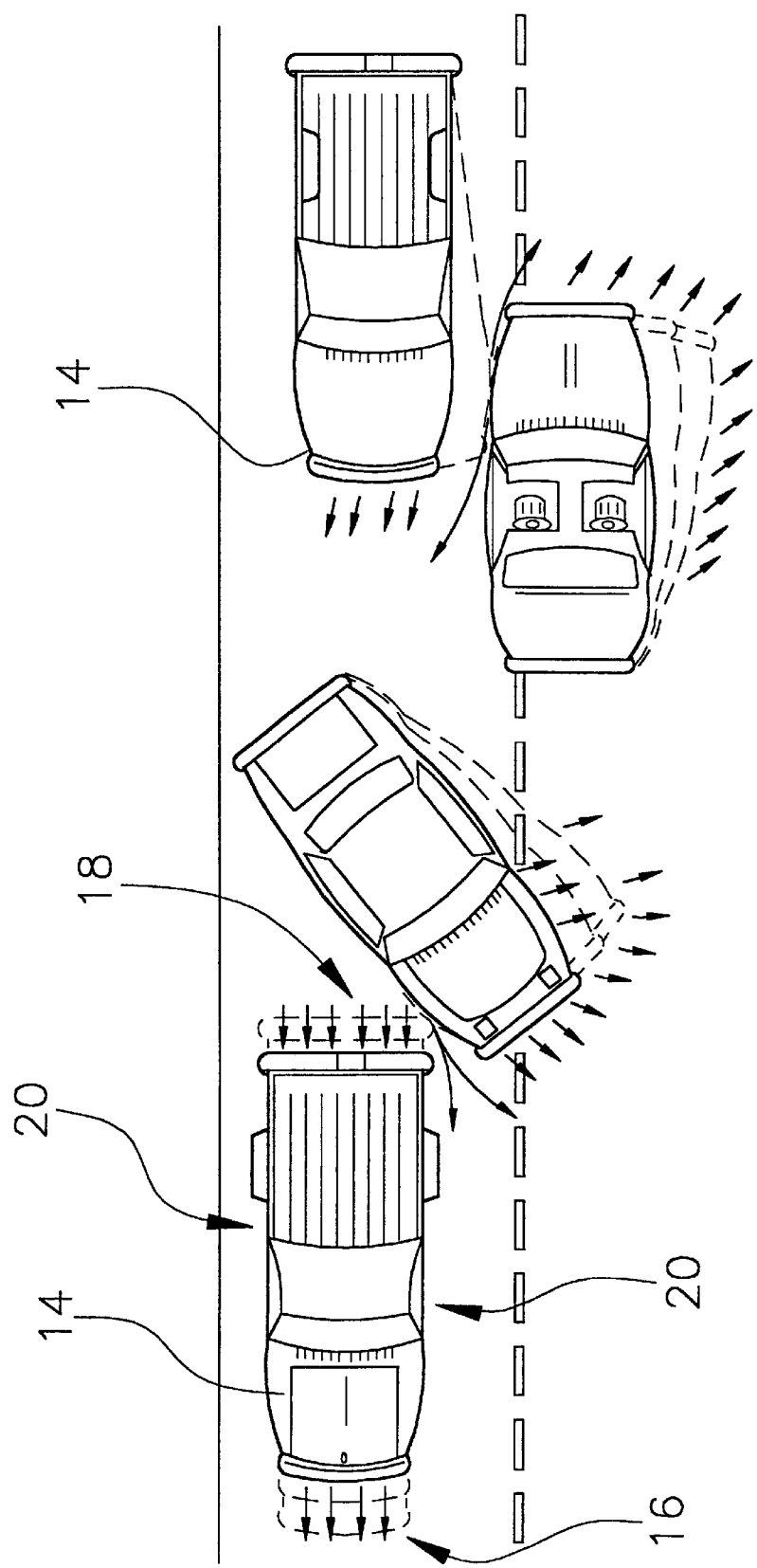
FIG. 1 is a schematic top view of a new magnetic repulsion system to prevent collisions according to the present invention.
Figure 5:
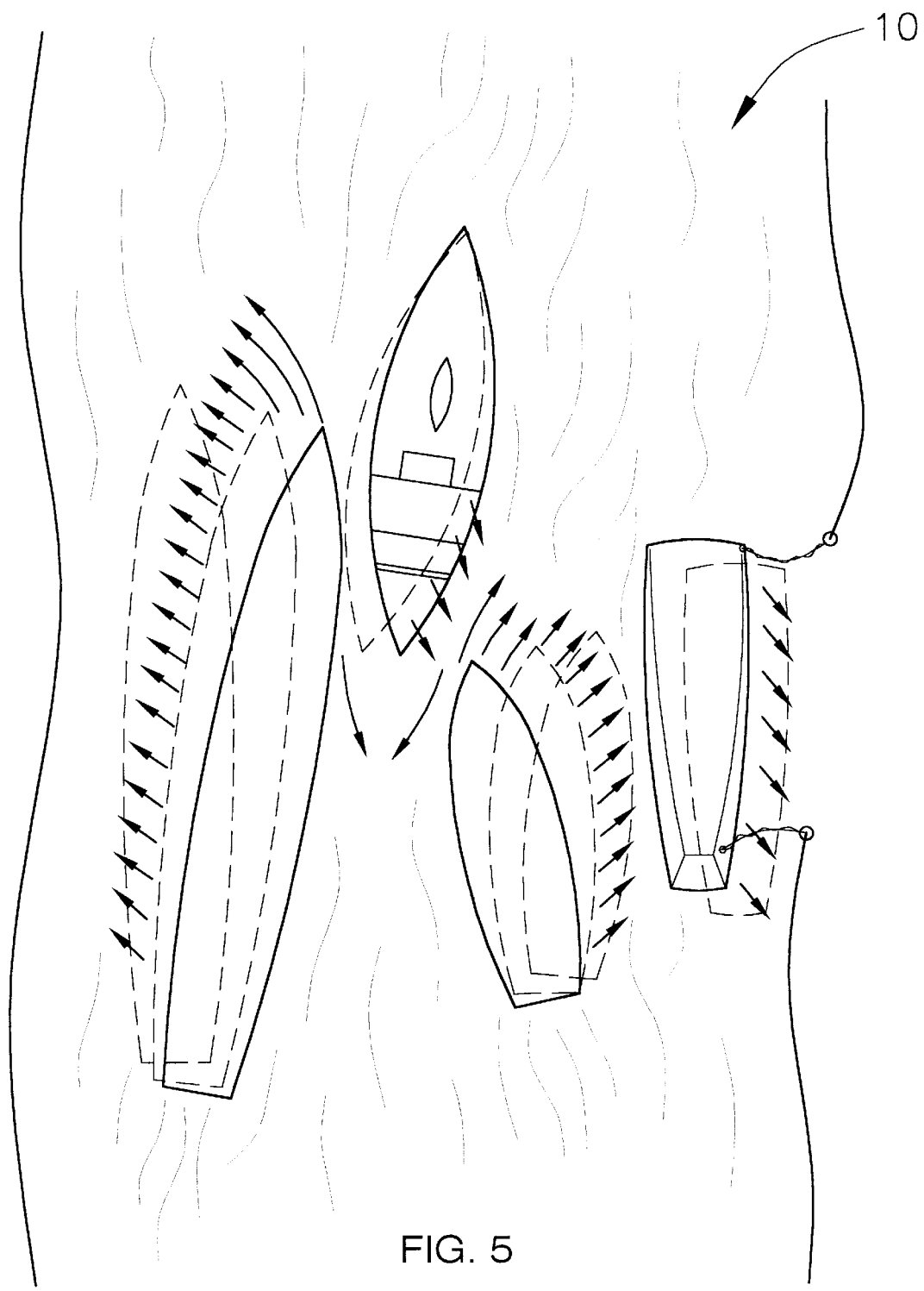
FIG. 5 is a schematic top view of the present invention implemented in a marine environment.
Figure 6:
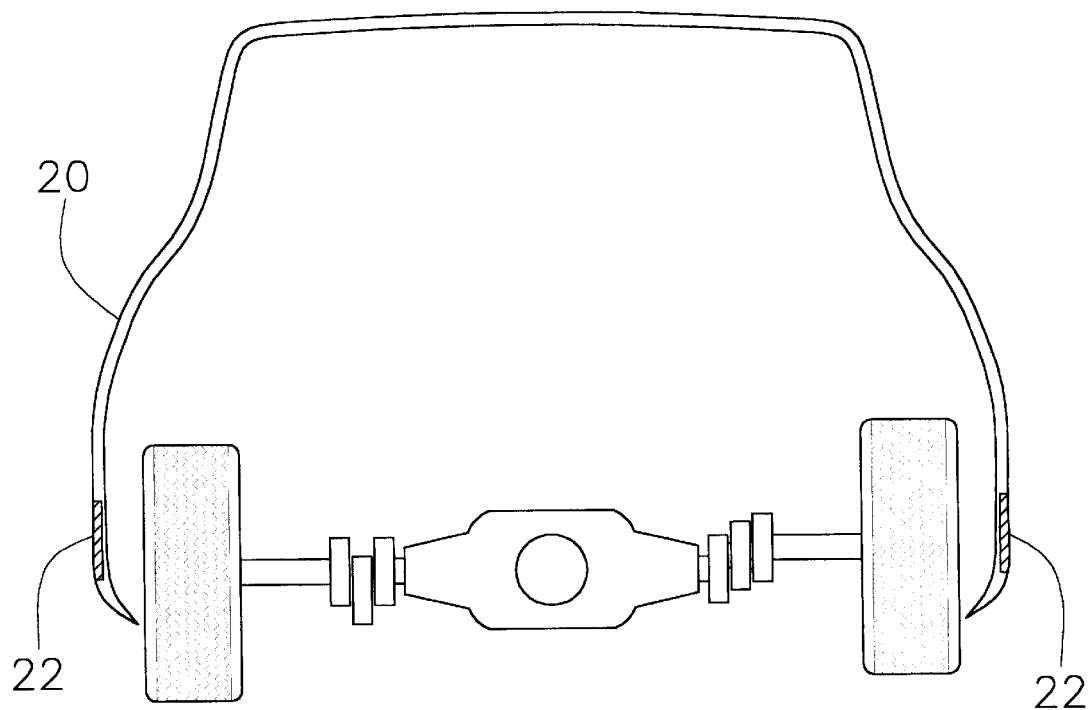
FIG. 6 is a schematic cross-section view of a vehicle utilizing the present invention.

With reference how to the drawings, and in particular to FIGS. 1 through 6 thereof, a new magnetic repulsion system to prevent collisions embodying the principles and concepts of the present invention and generally designated by the reference numeral 10 will be described.

As best illustrated in FIGS. 1 through 6, the magnetic repulsion system 10 to prevent collisions generally comprises a plurality of motor vehicles 12. Each has a body 14 including a front side 16, a back side 18, and a pair of lateral sides 20, each one of said sides having an exposed outer surface and a non-exposed inner surface. The vehicle may also include land, air, water or rail vehicles.

Each of a plurality of bars 22 is magnetized and has the same polarity. Each of the bars 22 is coupled to the inner surface of one of the vehicles 12. Any conventional fastening method may be used couple the bars 22 to the vehicle, though welding is preferred. Each of the front 16, back 18 and lateral 20 sides has at least one of the bars 22 thereon such that the bars 22 extend along a perimeter of each of the motor vehicles 12. Each of the bars 22 comprises a magnetized iron and has a negative magnetic polarity. Ideally, the bars 22 to be positioned on the front and back sides have bends 24 therein to resemble conventional bumpers.

The bars may also be used on watercraft, or other mobile vehicles, to prevent such from colliding.

In use, the bars 22 on a first of the vehicles 12 are repelled by the bars 22 on a second of the vehicles by the magnetic polarity of the bars. The device prevents the collision due to the magnetic forces. Should the vehicles collide, the device retards the collision by slowing the collision of the vehicles and lessens the damage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collision prevention and retardation system comprising:
   a plurality of mobile vehicles each having a body having multiple body panels each having an exposed outer surface and a non-exposed inner surface;
   a plurality of bars, each of said bars being magnetized and having the same polarity, each of said bars being coupled to said inner surface of one of said vehicles such that said bars substantially extend along a perimeter of each of said vehicles; and
   wherein bars on a first of said vehicles are repelled by bars on a second of said vehicles by the magnetic polarity of said bars.

2. The collision prevention and retardation system as in claim 1, wherein each of said mobile vehicles comprises a motor vehicle each having a body including a front side, a back side, and a pair of lateral sides, each one of said sides having an exposed outer surface and a non-exposed inner surface.

3. The collision prevention and retardation system as in claim 1, wherein each of said mobile vehicles comprises a boat.

4. The collision prevention and retardation system as in claim 1, wherein each of said bars comprises magnetized iron and has a negative magnetic polarity.

5. A collision prevention and retardation system comprising:
   a plurality of motor vehicles each having a body including a front side, a back side, and a pair of lateral sides, each one of said sides having an exposed outer surface and a non-exposed inner surface;
   a plurality of bars, each of said bars being magnetized and having the same polarity, each of said bars being coupled to said inner surface of one of said vehicles, wherein each of said front, back and lateral sides has at least one of said bars thereon such that said bars extend along a perimeter of each of said motor vehicles, each of said bars comprising a magnetized iron and having a negative magnetic polarity; and wherein bars on a first of said vehicles are repelled by bars on a second of said vehicles by the magnetic polarity of said bars.

6. A collision prevention and retardation device for attaching to a plurality of bodies of vehicles, each vehicle body having a plurality of body panels, each panel having an exposed outer surface and a non-exposed inner surface, said device comprising:

a plurality of bars, each of said bars being magnetized and having the same polarity, each of said bars being coupled to said inner surface of one of said vehicles, wherein each of said front, back and lateral sides has at least one of said bars thereon such that said bars substantially encompass each of said motor vehicles, each of said bars comprising a magnetized iron and having a negative magnetic polarity; and wherein bars on a first of said vehicles are repelled by bars on a second of said vehicles by the magnetic polarity of said bars.

* * * * *